Patented Aug. 28, 1923.

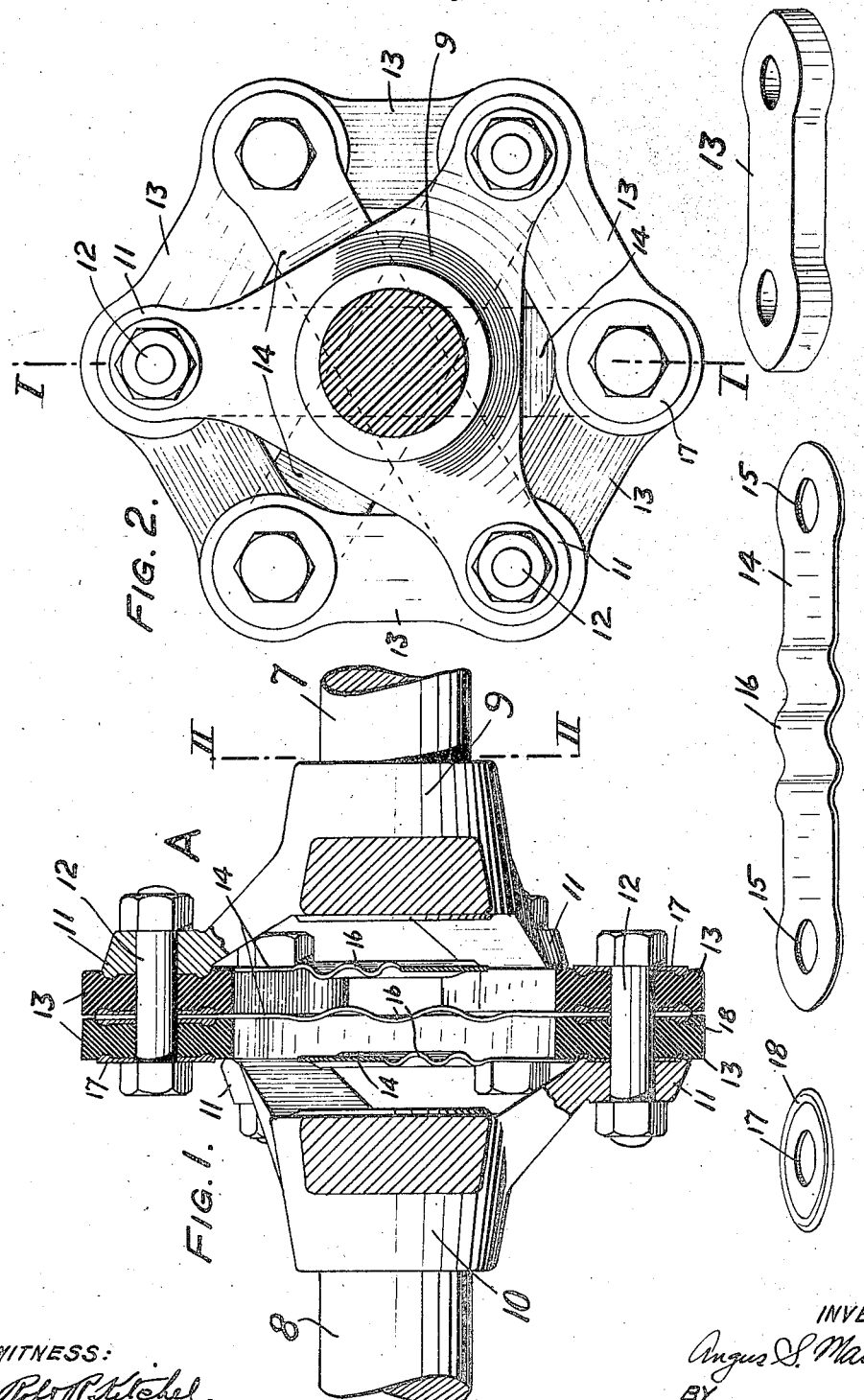

1,466,238

UNITED STATES PATENT OFFICE.

ANGUS S. MACDONALD, OF GREAT NECK STATION, NEW YORK, ASSIGNOR TO SNEAD & CO. IRON WORKS, A CORPORATION OF NEW JERSEY.

FLEXIBLE JOINT.

Application filed April 22, 1920. Serial No. 375,671.

*To all whom it may concern:*

Be it known that I, ANGUS S. MACDONALD, a citizen of the United States, and a resident of Great Neck Station, county of Nassau, and State of New York, have invented certain new and useful Improvements in Flexible Joints, of which the following is a specification.

This invention relates to flexible joints such, for example, as are suitable for use in propeller shaft assemblies and the invention is particularly useful in connection with automotive drive shafts.

One of the primary objects of my invention resides in the provision of an improved joint which combines simplicity, strength and requisite flexibility, and in which the parts are maintained in proper alinement.

Another object of the invention resides in the provision of a joint of the character described in which the amount of material ordinarily used for the flexible elements thereof may be reduced.

My invention also contemplates the provision of an improved joint having a novel arrangement of peripheral or circumferential torque transmitting elements with diametral centering devices, in which the stresses are transmitted in straight lines, while at the same time proper alinement is maintained.

The foregoing, together with such other objects as may hereinafter appear, I obtain by means of a construction which I have illustrated in preferred form in the accompanying drawings, wherein—

Figure 1 is a section taken on the line 1—1 of Figure 2 through a joint embodying my improvement; Figure 2 is a section taken on the line 2—2 of Figure 1; Figures 3, 4 and 5 are perspective views illustrating details.

Referring now to Figure 1, for purposes of illustration the right hand shaft 7 may be taken as the driving shaft and the shaft 8 as the driven shaft, the two shafts being connected by the flexible joint indicated as a whole by the reference letter A. The joint comprises the spider members 9 and 10 respectively secured to the ends of the shaft 7 and 8, each spider being preferably provided with three feet 11, the ends of which are rounded; the bolts or parts 12, of which there is one for each spider foot; the rubberized fabric links 13 which extend peripherally of the joint, connecting the foot of one spider with the adjacent foot of the opposite spider; and the diametral centering strips 14, the purpose of which hereinafter be set forth.

It will be seen from inspection of the drawings that the spiders are arranged so that the spider feet are spaced substantially 60° apart, and each of the links 13 connects a foot of one spider with the next foot of the other spider so that each holding bolt 12 serves to secure adjacent ends of two links. The torque of the shaft 7 is, therefore, transmitted to the shaft 8 through the spider 9 and the set of links and the spider 10 by virtue of the bolts 12.

The centering strips or pieces 14 have a bolt hole 15 at each end and they connect the diametrically opposite bolts of the respective spiders, one strip being located between pairs of links 13 and the remaining two strips being intermediate the respective spiders and the links, as indicated in Figure 1. Intermediate their ends the strips are corrugated as at 16 to provide the requisite elasticity.

Washers having an annular bead at the periphery are provided between the links and also under the heads of the bolts 12 and the feet of the spiders are also provided with a similar bead. The links are, therefore, tightly gripped when the nuts on the bolts 12 are drawn up and the strains are distributed over a wide area, which tends to prolong the life of the joint. It is also to be noted that the arrangement of the beading is such that there is little or no tendency to crowd out the material from under the washers and the spider feet.

Heretofore, it has been common practice in this art to utilize a plurality of discs, preferably three in number, for the flexible element of the joint, but by our present improvements it is possible to materially cut down the amount of material required while, at the same time, we are enabled to use links of stout construction and of relatively increased thickness.

In addition, the stresses on the links are in straight lines and there is no tendency to unusually stretch the material as is the case where discs are employed.

Furthermore, the centering strips function to yield sufficiently during flexure of the joint and yet center the parts, thus taking care of alinement difficulties which would otherwise be present.

I claim:

1. A joint of the character described comprising in combination a pair of shafts, a joint member on each shaft, each of which is provided with a plurality of posts, the posts of one member being offset with respect to the posts of the other member, a plurality of circumferentially disposed links each of which connect a post of one member with the post of another member, and a plurality of diametrically disposed centering strips connecting the posts of one member with the posts of the other member.

2. In a flexible joint for shafting including spider members provided with posts, the combination of a plurality of yieldable links connecting posts peripherally of the joint and adapted to transmit the stresses in straight lines between posts and a plurality of diametral yieldable centering strips.

3. A joint of the character described comprising joint members for shafts to be flexibly coupled, each joint member having posts offset from and diametrally opposed to posts of the other joint member, a plurality of flexible links, each connecting a post of one member with a post of another peripherally of the joint, and a plurality of flexible centering strips connecting diametrally opposed posts of the two members.

In testimony whereof, I have hereunto signed my name.

ANGUS S. MACDONALD.